(12) United States Patent
Nethery, III

(10) Patent No.: US 9,083,173 B2
(45) Date of Patent: Jul. 14, 2015

(54) POWER GENERATION AND CONTROL SYSTEM

(76) Inventor: Stanton Kee Nethery, III, Emeryville, CA (US)

( * ) Notice: Subject to any disclaimer, the term of this patent is extended or adjusted under 35 U.S.C. 154(b) by 1026 days.

(21) Appl. No.: 12/544,338

(22) Filed: Aug. 20, 2009

(65) Prior Publication Data

US 2010/0052429 A1  Mar. 4, 2010

Related U.S. Application Data

(60) Provisional application No. 61/136,342, filed on Aug. 28, 2008.

(51) Int. Cl.
*H02J 9/00* (2006.01)
*H02H 3/00* (2006.01)
*H02H 11/00* (2006.01)

(52) U.S. Cl.
CPC .............. *H02H 3/003* (2013.01); *H02H 11/008* (2013.01); *Y02B 10/14* (2013.01); *Y02E 10/56* (2013.01)
USPC .............................................. 307/64; 307/68

(58) Field of Classification Search
USPC ..................................... 307/64, 68
See application file for complete search history.

(56) References Cited

U.S. PATENT DOCUMENTS

| | | | |
|---|---|---|---|
| 4,103,493 A | 8/1978 | Schoenfelder | |
| 5,268,850 A * | 12/1993 | Skoglund | 700/297 |
| 5,532,525 A | 7/1996 | Kaiser et al. | |
| 5,536,976 A | 7/1996 | Chuchill | |
| 5,684,710 A | 11/1997 | Ehlers et al. | |
| 5,977,659 A | 11/1999 | Takehara et al. | |
| 6,320,732 B1 * | 11/2001 | Norman et al. | 361/62 |
| 6,583,521 B1 | 6/2003 | Lagod et al. | |
| 7,030,514 B2 * | 4/2006 | Wareham et al. | 307/126 |
| 2002/0003379 A1 * | 1/2002 | Wilhelm | 307/66 |
| 2002/0036430 A1 | 3/2002 | Welches et al. | |
| 2003/0051476 A1 | 3/2003 | Reno | |
| 2003/0075982 A1 | 4/2003 | Seefeldt | |
| 2004/0169972 A1 | 9/2004 | Goss | |
| 2009/0073726 A1 * | 3/2009 | Babcock | 363/20 |
| 2009/0225501 A1 * | 9/2009 | Luebke et al. | 361/644 |

OTHER PUBLICATIONS

SmartHomeUSA.com, "How X10 Works", http://www.smarthomeusa.com/info/x10theory/#theory.
Wikipedia, "ZigBee", http://en.wikipedia.org/wiki/ZigBee#Controversy.

(Continued)

*Primary Examiner* — Rexford Barnie
*Assistant Examiner* — Dru Parries
(74) *Attorney, Agent, or Firm* — Diederiks & Whitelaw, PLC

(57) ABSTRACT

A power generation and control system is easily installed in a consumer household, a business, or an end-user establishment for generating power and preventing power from flowing to a power grid from a consumer circuit during a power outage. A communications transceiver is adapted to transmit a permission signal for allowing power generation only after the control system has been installed. The control system can be adapted to replace an existing circuit breaker in a household circuit breaker box and prevents power from traveling from consumer power generators to the grid during a power outage. In the same manner that end-users can add appliances to existing circuits, end-users can easily add additional power generation devices without hiring a professional electrician and without worrying about causing harm to utility workman during power outages.

21 Claims, 5 Drawing Sheets

(56) References Cited

OTHER PUBLICATIONS

HomePlug Powerline Alliance, Inc., "HomePlug AV White Paper", pp. 1-11, 2005.

SmartHomeUSA.com, "How X10 Works", http://www.smarthomeusa.com/info/x10theory/#theory, Feb. 2007.

Wikipedia, "ZigBee", http://en.wikipedia.org/wiki/ZigBee#Controversy, Feb. 2007.

* cited by examiner

POWER GENERATION AND CONTROL SYSTEM

CROSS-REFERENCE TO RELATED APPLICATIONS

The present invention claims the benefit of U.S. Provisional Patent Application Ser. No. 61/136,342 entitled "Power Generation and Control System" filed Aug. 28, 2008.

BACKGROUND OF THE INVENTION

1. Field of the Invention

The present invention pertains to the art of power generation and power generation control systems and, more particularly, to power generation and power generation control systems that can be easily installed in a consumer household, a business or other end-user establishment.

2. Discussion of the Prior Art

In general, large centralized power grids or networks are utilized to provide power to multitudes of consumer households, businesses and other end-users. Distribution of electric power from power plants to households and businesses is conducted over a network of utility lines connected to each residence and business. A standard consumer household, business or end user establishment has a consumer circuit that includes a circuit breaker that controls power to numerous individual circuits, each with its own circuit breaker. Generally, three-phase power is split into two sets of circuit breakers, one per phase, or two separate power phase groupings of circuit breakers. Should something happen to a specific circuit such as having a device attached to the circuit fail, that individual breaker opens and halts the flow of power to the device that failed. Should that individual circuit breaker fail, an upstream breaker opens and cuts the flow of power to all the circuits in the home business or end-user establishment.

Each of the large centralized power grids is interconnected with various generating stations and substations that supply power to various loads and monitor utility lines for problems. Each of the power grids has a number of disadvantages, including reliance upon certain vital connections to power plants, as well as distribution difficulties during peak power demand periods. One solution to power supply problems is to install one or more power generating devices at a consumer's residence or business. In some instances, it is desirable to feed extra power generated by such devices back into the centralized grid, where the power may be shared. Such devices preferably include photovoltaics, wind power, hydroelectric generators and fuel cells, along with conventional and variable speed diesel engines, Stirling engines, gas turbines, micro-turbines and hybrid vehicles. Additionally, storage systems, such as batteries, super-conducting, flywheel, pumped water and capacitor types, may also provide power during outages. However, there are a number of problems associated with utilizing such power generation and storage devices. For example, the engineering, permitting and installation costs for a solar panel power generation and control system can be as much as the cost of the equipment being installed. Much of the installation cost results from the necessity of developing engineering documents, obtaining permits and hiring a qualified installer or electrician to connect the system to the centralized power grid based on particular engineering and building code specifications. Each end-user electrical system typically has the same components: a power generation system, a connection to the power grid, safety systems and, preferably, an energy storage device. Although most end-user electrical systems are conceptually the same, each one requires a custom installation. Household appliances such as lamps, radios, stoves, etc. are also connected to the power grid but, unlike power generation systems, anyone can buy and install such appliances without the need for developing engineering documents and hiring qualified installers such as an electrician.

Although there are many reasons why end-user power generation systems require a custom installation, one major reason they are not "plug and play" in the same way as appliances is that, if during a power grid outage, the end-user power generation system was to feed power back to the grid, it would become a danger to utility workers handling power lines. Household appliances such as lamps, radios, stoves, etc. present no such risk because they do not generate or provide power and, therefore, anyone may install them without developing engineering documents, obtaining permits or hiring an electrician. More specifically, when a utility line needs maintenance or repair, the lines are disconnected from the power grid and the utility workers assume that no power is being supplied to the line. If there is end-user power supplied to the line downstream of a disconnect point, that assumption could be fatal.

One such scenario is depicted in FIG. 1, showing a consumer household, business or other end-user establishment 20 including an end-user electric power generation system 25 in communication with a power grid 26 via a power line 28. A standard main circuit breaker 30 is provided between end-user electric power generation system 25 and power line 28, which connects to the main power grid 26 through switch 48. As depicted, households 40 are supplied with power 44 produced by a power plant 46. When an outage occurs, power 44 is blocked at switch 48 in order for a utility worker 50 to work on power line 28. However, end-user supplied power indicated by arrow 55 from electric power generation system 25 may continue to flow through power line 28, endangering the utility worker 50, and may even flow into an end-user establishment 60. This situation shows the importance of hiring a qualified electrician 61 when installing prior art electric power generation system 25.

One solution to such a problem is set forth in U.S. Patent Application Publication No. 2002/0036430 directed to a local area grid for distributed power. The '430 document notes that a utility can impress a "kill" signal on main power grid lines for power conditioning unit disconnect from a grid for servicing. This connection allows power utilities to monitor and track power flow. However, such a system requires expensive installation by trained professionals and relies on an external signal to be sent by the utility in order to provide a measure of safety for utility line workers.

Based on the above, there is a need for a power generation and control system allowing for the transfer of power between a power generator and a power line that eliminates the possible danger to utility workers and can be quickly and inexpensively installed by anyone.

SUMMARY OF THE INVENTION

The present invention is directed to a system that prevents power from flowing back into a power grid during a power outage and prevents end-user installable power generation systems from operating on a power circuit that does not have this protection. As such, the invention provides all the necessary components for power generation systems so that they can be purchased and installed by anyone without the added expense of engineering documents, permits or qualified installers such as electricians.

In a preferred embodiment of the invention, a power generation and control system is easily installed in a consumer household, a business or an end-user establishment; generates power; and prevents power from flowing to a power line from a consumer circuit during a power outage. The end-user electrical system power generation and control system includes a main power flow controller for controlling a flow of power between the power grid and the consumer circuit. The controller includes an input adapted to be connected to the power grid and an output connected to the consumer circuit. A power sensor associated with the controller senses if power is in the power line or if there is a flow of power between the power grid and the consumer circuit. A power control switch located between the power sensor and the output interrupts the flow of power between the power line and the consumer circuit when the power sensor senses a power outage in the power line and there is power being generated in the consumer circuit that is flowing to the power grid. In another preferred embodiment, a communications transceiver is adapted to transmit a permission or enabling signal across the consumer circuit. Alternatively, the communications transceiver is adapted to transmit the signal wirelessly or through separate dedicated wires. The power generation controller includes a power generation transceiver adapted to receive the signal generated by the power line communications transceiver. The power generation controller ensures that the power generation device will only operate when it receives permission from the power flow controls through the consumer circuit connecting the controller and generators. This ensures that the controller is upstream of and controls the specific consumer power circuit of the generator. Once the power generator controller is installed, anyone can easily connect the power generation device without hiring a professional electrician knowing that repairmen will be safe in the event of a power outage.

In another preferred embodiment, a power storage unit is in communication with the power generation device and adapted to store power generated by the power generation device. The power storage unit provides a relatively low voltage power signal to power the power flow controller during an outage and can provide power to start the power generation device. In another preferred embodiment, when the power generation device is not providing power, the power generation device can be activated to supply relatively low voltage power to the power flow controller during a power outage and provide power to activate the power flow controller so that it can isolate the consumer circuit from the power circuit and grant permission to the power generator to supply power to the consumer circuit. This handles the situation when all power is off and the power generator is desired to be on but cannot receive permission to do so from the power controller because the power controller has no power to operate.

In yet another preferred embodiment, the control system is adapted to replace an existing circuit breaker in a household circuit breaker box. As such, the control system includes a circuit breaker that trips when it senses a power overload, thus protecting household electrical equipment on the consumer circuit. The control system may comprise a filter for stopping the enabling signal from entering the power line and another filter for stopping signals traveling from the power line to the consumer circuit such that no external signals turn on the power generating device. However, a filter is not required because the power generator can communicate with the power controller by drawing significant power (e.g., one amp) in an on/off fashion with a pattern generator to communicate with the power controller. Because it is drawing power, the main controller can only see this signal if the controller is absolutely upstream of the generator.

The system is installed in a consumer household or a business establishment by installing the power generation control system and user establishment generating a permission signal to indicate the presence of the control system; and enabling the power generation device to provide power only when the permission signal is provided by the control system. Preferably, this method also includes monitoring the power line to determine whether there is power on the power line and preventing power from flowing from the consumer circuit to the power line when there is no power on the power line, while allowing power to flow from the consumer circuit to the power line when there is power on the power line. Preferably, the method also includes supplying power to the control system with a relatively low voltage signal during a power outage. The method allows installation of the power generation device without requiring an electrician to modify the consumer circuit.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
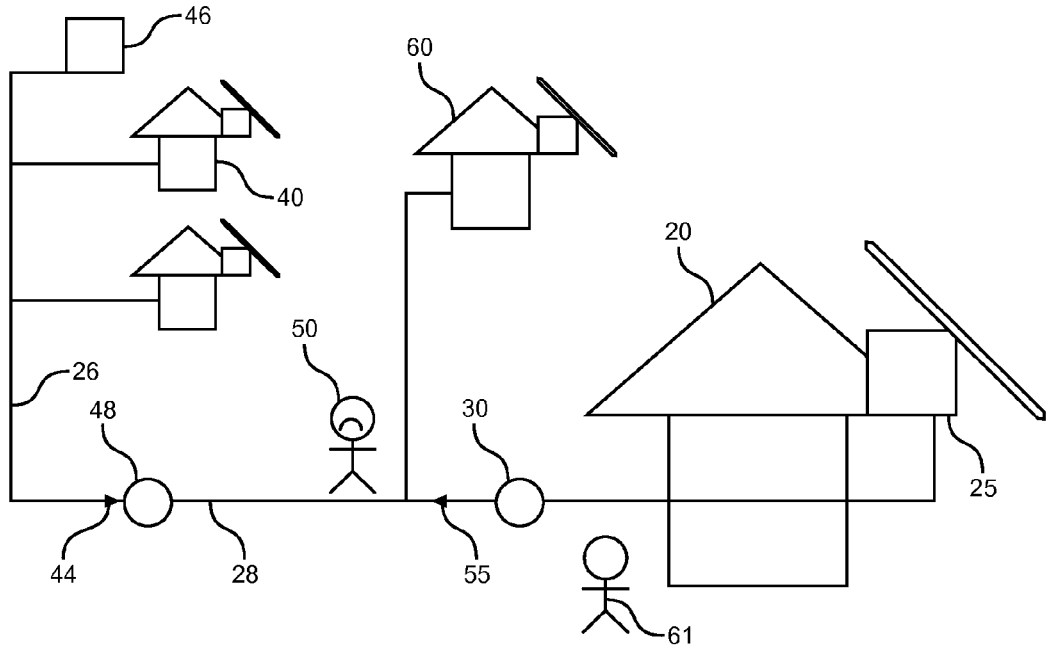
FIG. 1 depicts a situation in which a lineman is endangered by a prior art power generation and control system.
Figure 2:
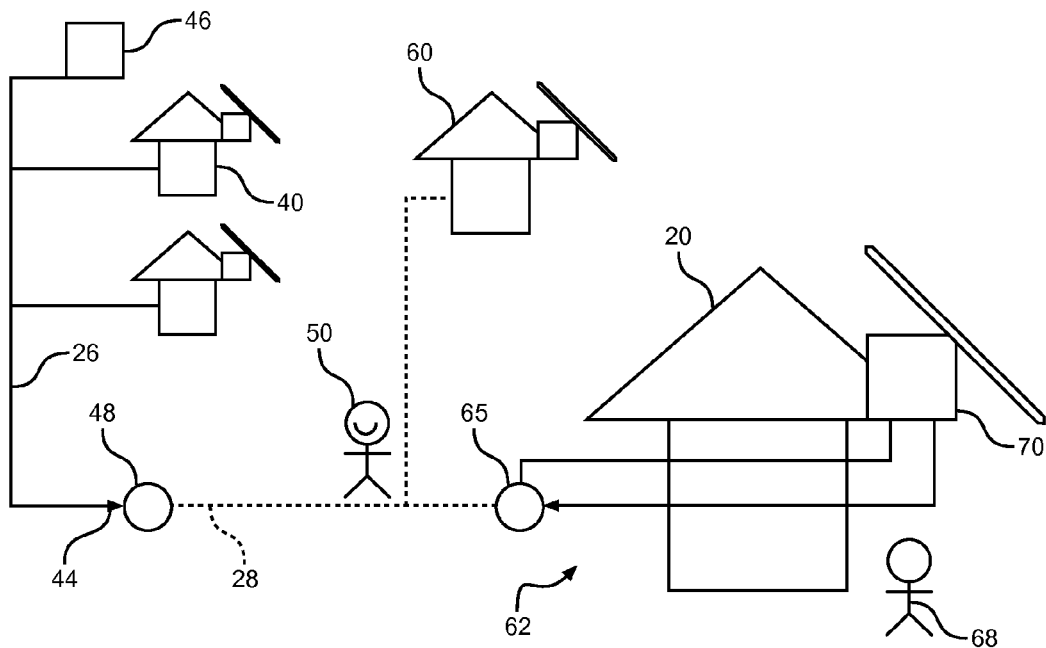
FIG. 2 depicts a situation in which a lineman is safe when a power generation and control system according to a preferred embodiment of the present invention is utilized.
Figure 3:
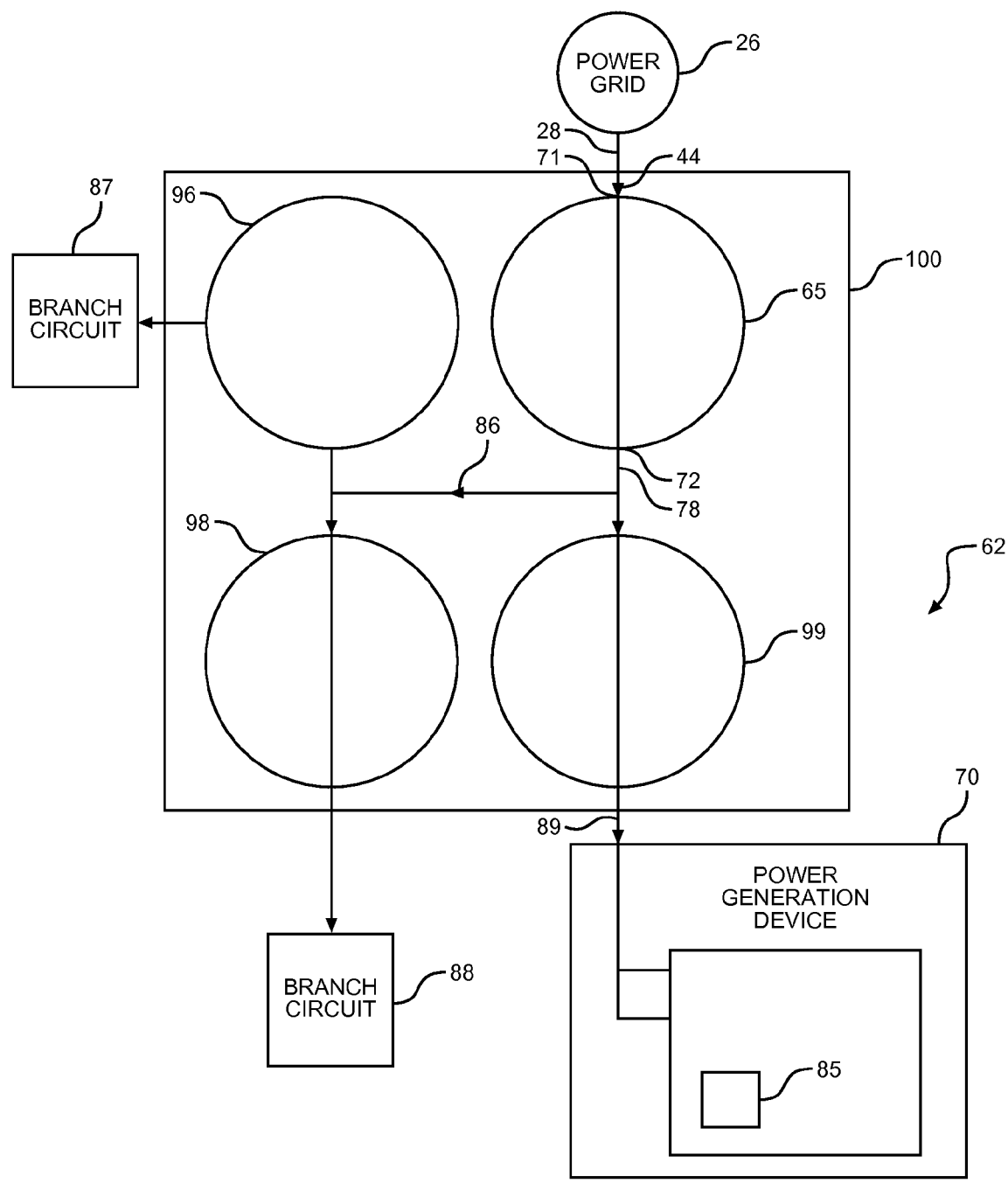
FIG. 3 is a schematic of the power generation and control system of FIG. 2 during a normal power event generally showing a power flow controller and a power generation device.

With initial reference to FIGS. 1-3, a consumer household, business or other end-user establishment 20 is provided with a power generation and control system 62 in accordance with a preferred embodiment of the invention. Power generation and control system 62 is shown in communication with power line 28, which receives power 44 through switch 48 from power grid 26. A main power flow controller 65 of the present invention, provided between an end-user power generation device 70 and power line 28, prevents any undesirable power feedback (corresponding to power feedback 55 shown in FIG. 1) from flowing to power line 28 from power generation device 70. As more fully explained below, power generation device 70 is installable by an end-user 68 and does not require an electrician 61 to install.

An overview of power generation and control system 62 of the present invention is depicted in FIG. 3. Power generation and control system 62 includes power generation device 70 and power flow controller 65. In the preferred embodiment shown, power flow controller 65 has an input 71 connected to line 28 and an output 72 connected to a line 78. Power flow controller 65 constitutes a circuit breaker upstream from power generation device 70. Optionally, a power storage unit 85 may also be utilized, either alone, or as part of power generation device 70. During a normal power event, power flow controller 65 controls a flow of power 44 supplied by power grid 26 through power line 28, and thus controls the flow of power 86 to branch circuits 87, 88 and 89 located downstream of power flow controller 65. Of course, circuits 87, 88 and 89 could be located in a household, a business or in any end-user establishment. In a manner known in the art, individual circuit breaker 96 controls power 86 from output 72 to is branch circuit 87, while individual circuit breaker 98 controls power 86 from output 72 to branch circuit 88. Although depicted as a main circuit breaker, it should be understood that power flow controller 65 could optionally constitute a branch circuit breaker between a main breaker and power generation device 70, such as individual circuit breaker 99. Preferably, circuit breakers 65, 96, 98 and 99 are all housed in a household circuit breaker box 100 within household or business 20.

Figure 4:
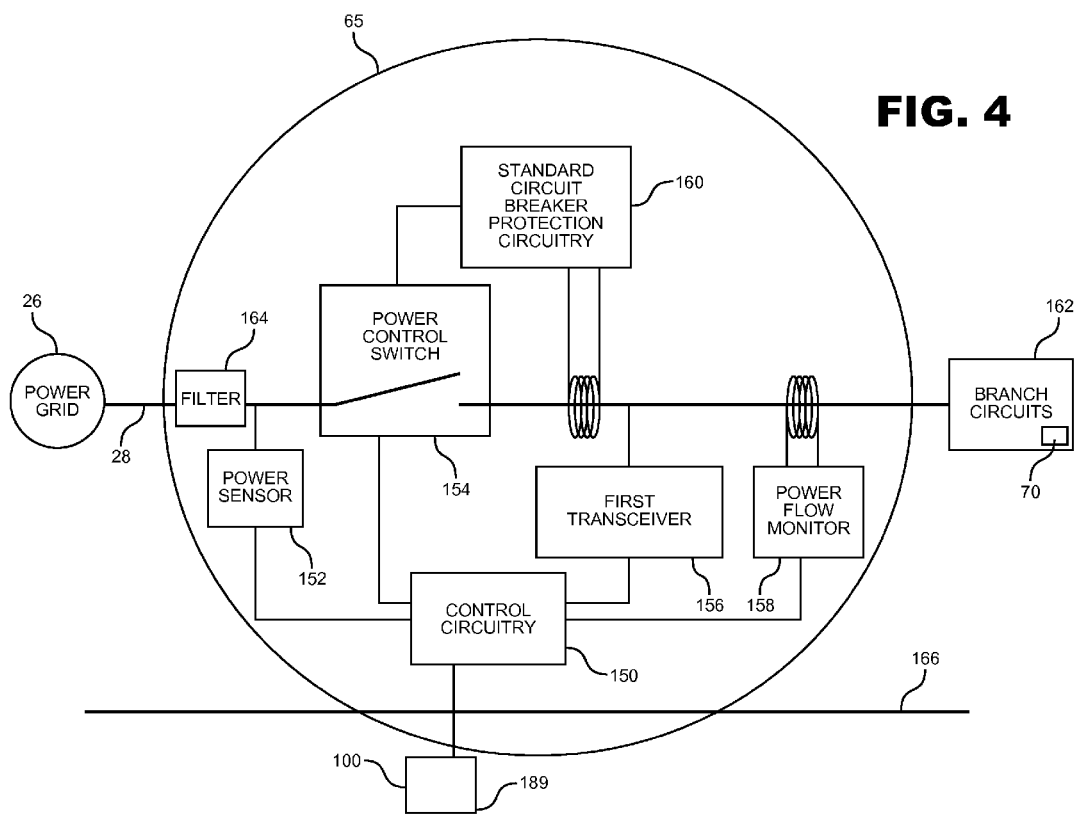
FIG. 4 is a diagram of the power flow controller of FIG. 3.

FIG. 4 will now be referenced in detailing, power flow controller 65 of the present invention. Power flow controller 65 includes control circuitry 150 in communication with a power sensor 152, a power control switch 154, a first transceiver 56 and a power flow monitor 158. Although only one switch 154 is shown, it should be understood that additional switches could be utilized in the system. Power sensor 152 senses whether there is power in power line 28. During a power outage, power flow monitor 158 will signal control circuitry 150 of the outage so that power flow controller 65 may respond to the outage. Power control switch 154 is situated to open if power generation device 70 is providing power during a power outage on power line 28, thus separating power generation device 70 from power line 28. Additionally, standard circuit breaker protection circuitry 160 is provided between consumer circuit 162, which includes branch circuits 87, 88 and 89, and power line 28. More specifically, circuit breaker protection circuitry 160 will open a switch, such as power control switch 154, in the event consumer 162 draws too much power.

First transceiver 156 may be, for example, an X10, HomePlug™ or wireless transceiver such as a Zigbee™ transceiver, and is utilized to send signals to and exchange data with one or more power generation devices 70. Optionally, a filter 164 may be provided between transceiver 156 and power grid 26 to prevent transceiver 156 from sending signals to or receiving signals from other end-user establishments 60. Power flow monitor 158 is adapted to determine whether one or more power generation devices 70 downstream of power flow controller 65 supply power to power line 28. Line 166 represents a neutral power line.

Figure 5:
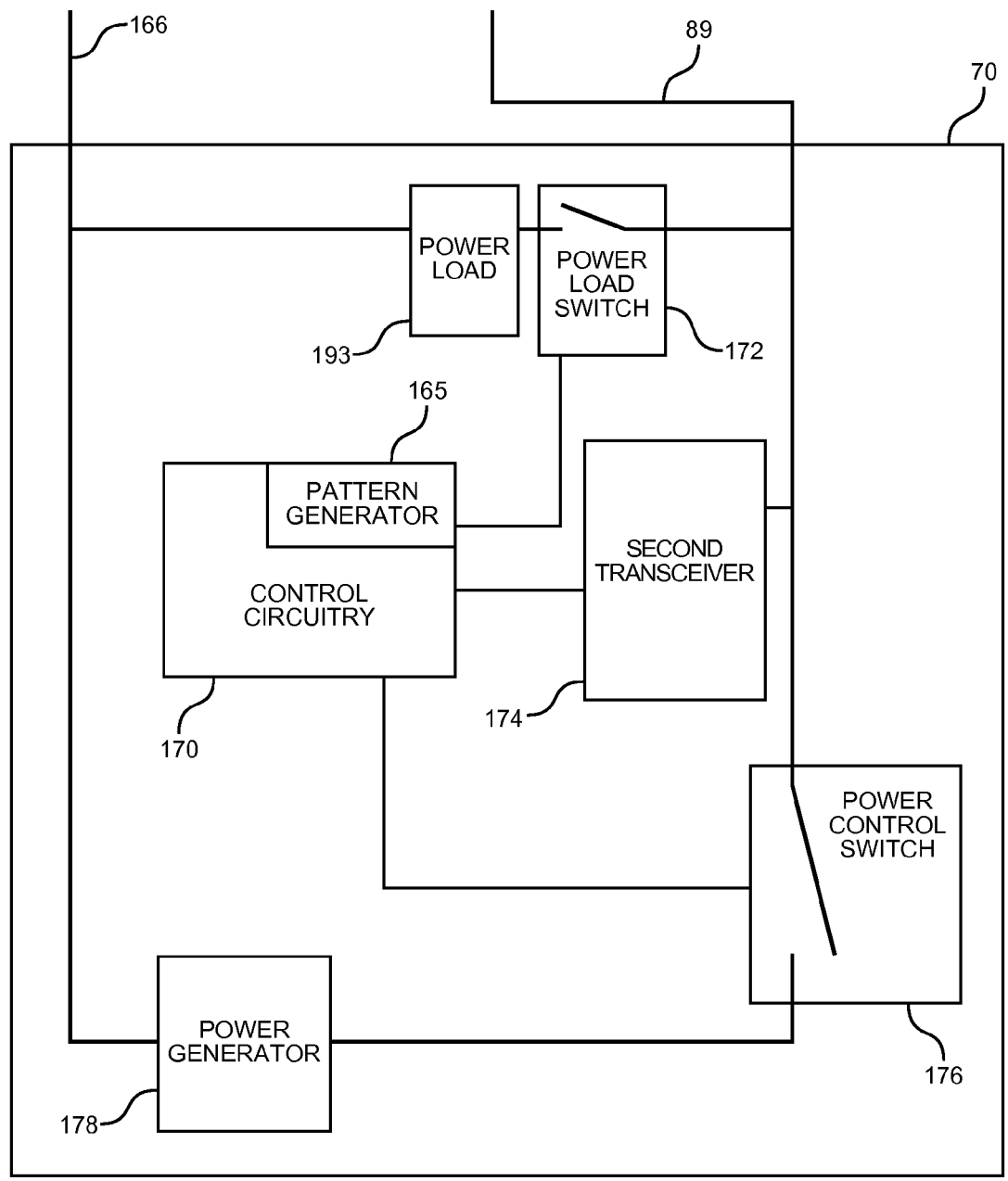
FIG. 5 is a diagram of a power generation device of FIG. 3.

FIG. 5 will now be referenced in detailing power generation device 70 of the present invention. Power generation device 70 includes control circuitry 170 in communication with a power load switch 172 controlling power flow to a power load 173, a second transceiver 174, a power sensor 175, a power control switch 176 and a relatively low voltage power control switch 176. Second transceiver 174 may be, for example, an X10, HomePlug™ or wireless transceiver such as a Zigbee™ transceiver, and is utilized to accept signals from and exchange data with power flow controller 65 upstream from power generation device 70. Alternatively, the two transceivers may communicate through a wire or other communication system. Additionally, a power generator 178 is provided to generate power. In a preferred embodiment of the present invention, generator 178 is in the form of solar panel cells, although it should be readily understood that any type of power generator might be utilized with the present invention. For example, generator 178 may be a group of batteries or a gas/diesel fueled generator or the combination of batteries and fueled generator in a hybrid vehicle.

In a preferred embodiment, power flow controller 65 is adapted for use with multiple power generation devices 70. When consumer 68 desires to install power generation and control system 62, consumer 68 will install or have installed power flow controller 65 between power line 28 and consumer circuit 162. Preferably, a licensed professional electrician 61 will conduct the installation of the power flow controller 65. Once power flow controller 65 is installed, the consumer 68 may choose one or more desired types of power generation devices 70, such as a solar panel type power generator device. Advantageously, after power flow controller 65 is connected, the consumer or anyone for that matter 68 may install one or more power generation devices 70 without the aid of electrician 61.

In a manner known in the art, when standard circuit breaker protection circuitry 160 of power flow controller 65 senses that too much power is being supplied by power line 28, power control switch 154 is tripped and power can no longer flow between power line 28 and consumer circuit 162.

The manner in which the present invention is utilized in the event of power being supplied by power line 28 and a desire to have power generation device 70 provide power to branch circuits 87, 88, 89 and power line 28 will now be discussed with reference to FIGS. 4-6. Power on branch circuit 89 is sensed by power sensor 175. A request signal to provide power is sent by power generation device 70 via second transceiver 174 to any power flow controller 65. Each power flow controller 65 communicates via first transceiver 156 requesting power generation device 70 to respond with a confirmation that power flow controller 65 is between power generation device 70 and power line 28. In the preferred embodiment, power load switch 172 is toggled on and off in a particular pattern by a pattern generator 165 located within control circuitry 170 so that a signal measured by timed changes in current flow is generated by power load 173 and is sensed by power flow monitor 158. When power flow monitor 158 can sense the timed changes in current flow from power generation device 70, it responds via first transceiver 156 to second transceiver 174 and thus to control circuitry 170 with a signal permitting power generation device 70 to provide power. Control circuitry 170 then closes power control switch 176 allowing power to flow from power generator 178 to branch circuit 89. When power grid 28 is providing power and power generation device is providing more power than is consumed by branch circuits 87, 88 and 89, such excess power from power generation system 70 flows back into power grid 28 for use by others such as households 40 and adjacent house 60. In this example, if individual circuit breaker 98 was also a power flow controller, when power generation device 70 responds to the request for a signal to a power flow controller located at 98, that power flow controller would not sense the response and thus would not respond with permission for power generation device 70 to provide power to branch circuit 89.

The manner in which the present invention is utilized in the event of no power being supplied by power line 28 or to branch circuit 89 and a desire to have power generation device 70 provide power to branch circuits 87, 88 and 89 will now be discussed with reference to FIGS. 4-6. The assumption is that power control switch 154 is closed such that power line 28 is connected to line 78. No power on branch circuit 89 is sensed by power sensor 175. Low voltage power control switch 176 is turned on by control circuitry 170 to put relatively low voltage power onto branch circuit 89. This relatively low voltage power is below the safety threshold of concern for power utilities and is used to provide power to power flow controller 65 when power grid 28 is not supplying acceptable power. The power from low voltage power control switch 176 flows to power flow controller 65 enabling it to open power control switch 154 to isolate power line 28 from consumer circuit 162. A request to provide power is sent by power generation device 70 via second transceiver 174 to any power flow controller 65. Power flow controller 65 communicates via first transceiver 156 requesting power generation device 70 to respond with a signal that confirms that power flow controller 65 is between power generation device 70 and power line 28.

In the preferred embodiment, instead of a power load, power generation device 70 uses relatively low power voltage fluctuations to signal to power flow controller 65 that they are on the same circuit. Low voltage power control switch 176 varies the voltage supplied to branch circuit 89 so that power flow monitor 158 senses timed changes in the relatively low voltage. When power flow monitor 158 can sense the signal from power generation device 70, it responds via first transceiver 156 to second transceiver 174 and thus to control circuitry 170 with a signal permitting power generation device 70 to provide power. Control circuitry 170 then closes power control switch 176 allowing power to flow from power generator 178 to branch circuit 89. Control circuitry 170 then turns off low voltage power control switch 176. In this example, if individual circuit breaker 98 was also a power flow controller, power provided by low voltage power control switch 176 would allow that power flow controller to open its power control switch to isolate branch circuit 88 from line 86. The power flow controller at 98 would cease to receive relatively low voltage power on its downstream branch circuit 88 connection and it would not respond to the request to provide power sent by power generation device 70.

The manner in which the present invention is utilized in the event of a power outage on power line 28 while power generation device 70 is providing power to branch circuits 87, 88 and 89 and power line 28 will now be discussed with reference to FIGS. 4-6. In a manner known in the art, power flow monitor 158 senses that no power is being supplied via power line 28 or senses whether power is flowing in an appropriate direction between consumer circuit 162 and power grid 26. It should be noted that power could flow toward or away from power grid as represented by arrows 186. Control circuitry 150 isolates power line 28 from consumer circuit 162 by opening power control switch 154. Power generation device 70 continues to provide power to branch circuit 89.

The manner in which the present invention is utilized in the event that power generation device 70 is physically disconnected from branch circuit 89 will now be discussed with reference to FIGS. 4-6. In a manner known in the art, power sensor 175 senses that no power is being supplied via branch circuit 89 and that no power is flowing to branch circuit 89. A request to provide power is sent by power generation device 70 via second transceiver 174 to any power flow controller 65. Because no power flow controller is physically connected to power generation device 70, permission is not granted and power generation device 70 opens power control switch 176. Should power generation device 70 be reattached to a branch circuit that is not protected by a power flow controller, it will not put power onto that unprotected branch circuit.

Figure 6:
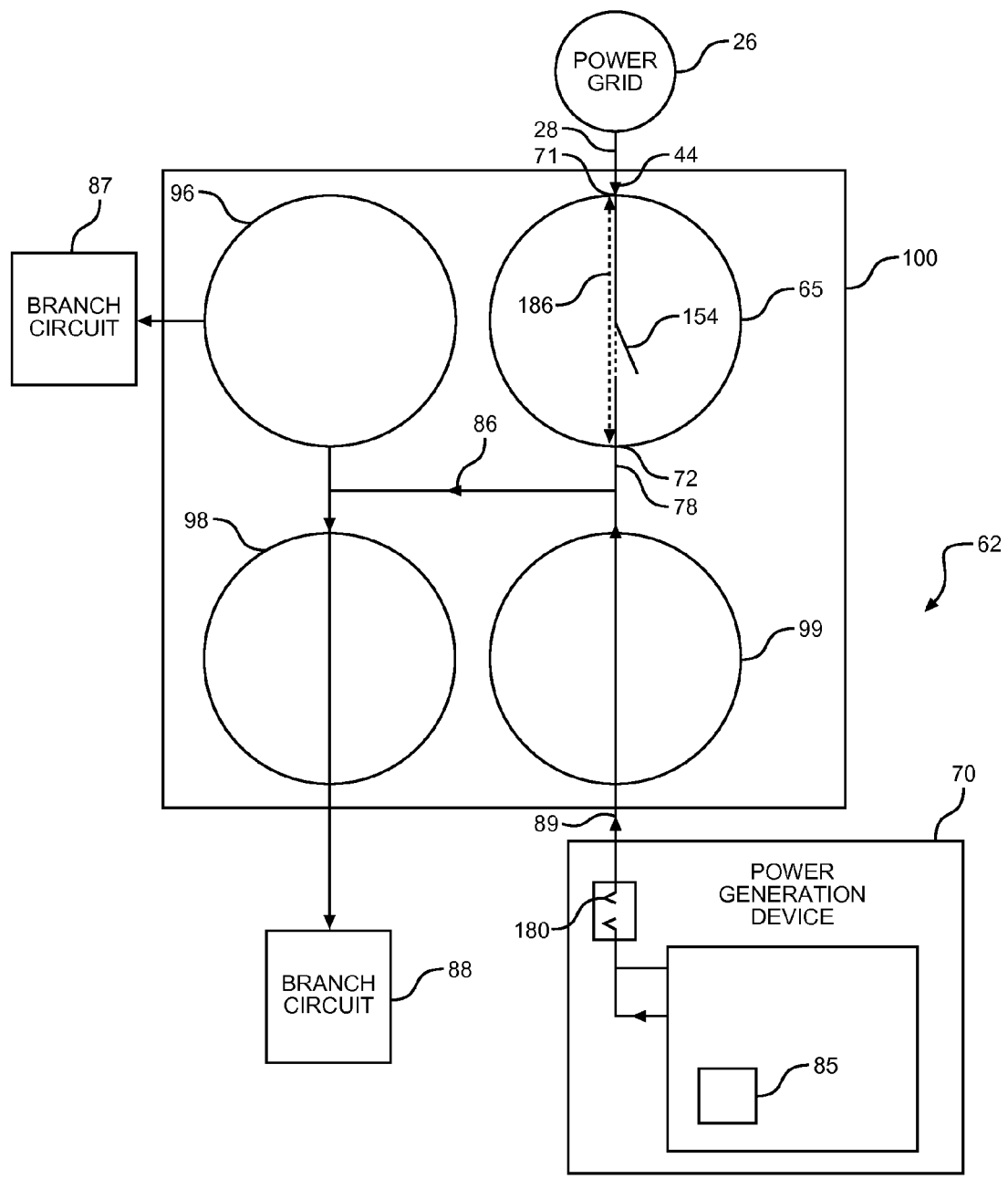
FIG. 6 is a schematic of the power generation and control system of FIG. 2 during a power outage event and also depicting a feedback configuration.

The initial request to provide power signal is sent by second transceiver 174 by power generation device 70 (see FIG. 6). When a power flow controller 65 receives the signal it responds through transceiver 156. The communications between transceiver 156 and transceiver 174 can be transmitted separate from the power lines 89 and 78. A permission signal 180 must travel through power lines 89 and 78 to confirm that power flow controller 65 protects power line 28 from power generation device 70. Once signal 180 is confirmed, communications between transceiver 156 and transceiver 174 contains information communicating that specialized power flow controller 65 of the present invention is in place, rather than a conventional circuit breaker. When permission to provide power is granted by power flow controller 65 to power generation device 70 via transceiver 156 and transceiver 174, power control switch 176 is flipped, allowing power generated by power generator 178 to flow to consumer circuit 162 in a safe manner. If signal 180 is not received by power flow controller 65, permission to provide power is not granted to power generation device 70 and power control switch 176 will remain in an off or deactivated position, and no power will be provided to consumer circuit 162. Signal 180 is preferably checked for only when power generator 178 is about to be activated. However, the signal 180 may be checked periodically or continuously, in which power generator 178 will only be enabled upon detection of the signal during a signal check. Optionally, a continuous signal may be utilized and is particularly advantageous in a system that experiences frequent power outages.

A user may press an actuator 189 in communication with power flow controller 65 to instigate a signal event that causes all power generation devices granted permission to operate by power flow controller 65, to cease providing power to consumer circuit 162 so that the branch circuits are fully off and can be worked on by a qualified electrician 61.

Although described with reference to preferred embodiments of the invention, it should be readily understood that various changes and/or modifications could be made to the invention without departing from the spirit thereof. For instance, although only one power generation device 70 is depicted, any desirable number of power generation devices may be utilized.

I claim:

1. An apparatus comprising a power generation and control system for preventing power from flowing to a power grid from a circuit, located in an end user establishment, including a branch circuit having an individual circuit breaker, during a power outage that can be installed in an end user establishment, the system having:
  a main power flow controller for controlling a flow of power between the power grid and the circuit, said controller including:
    an input connected to the power grid;
    an output connected to the circuit;
    a power sensor for sensing the flow of power; and
    a power control switch located between the power grid and the circuit interrupting the flow of power between the power grid and the circuit when there is no power in the grid, said switch being configured to allow a power generation device to be attached to the branch circuit downstream of the individual circuit breaker and not require communication between the control system and the power generation device.

2. The apparatus of claim 1, wherein the power generation device includes a generator for producing power and is connected to the branch circuit downstream of the individual circuit breaker whereby power produced by the generator is used by various loads placed on the circuit and is also sent to the grid through the power control switch.

3. The apparatus of claim 1, wherein the main power flow controller further includes a circuit breaker.

4. The apparatus of claim 3, wherein the main power flow controller is adapted to replace an existing circuit breaker in a circuit breaker box.

5. The apparatus of claim 3, wherein the main power flow controller is adapted to replace an electrical power meter.

6. The power generation and control system of claim 2, wherein the generator is selected from the group consisting of photovoltaic generators, wind powered generators, hydroelectric generators, fuel cells, diesel engines, Stirling engines, gas turbines, micro-turbines, and hybrid vehicles, and combinations thereof.

7. A power generation and control system adapted to be installed in an end user establishment circuit, including a branch circuit having an individual circuit breaker, for preventing power from flowing to a power grid from the circuit during a power outage, the system comprising:
   a power generating device for producing power when connected to the branch circuit downstream of the individual circuit breaker; and
   a main power flow controller for controlling a flow of power between the power grid and the circuit, said controller including:
      an input adapted to be connected to the power grid;
      an output adapted to be connected to the circuit;
      a power control switch adapted to be located between the power grid and the circuit for interrupting the flow of power between the power grid and the circuit when there is no power in the power grid; and
      a communications transceiver for giving permission for the power generation device to put power onto the circuit.

8. The power generation and control system of claim 7, wherein the power generating device comprises:
   a generator; and
   a power generation controller for controlling the generator including a second transceiver for receiving the permission generated by the power generation control system communications transceiver and ensuring that the power generation device puts power onto the circuit only when permitted.

9. The power generation and control system of claim 7, wherein the main power flow controller further comprises a circuit breaker.

10. The power generation and control system of claim 9, wherein the main power flow controller is adapted to replace an existing circuit breaker in a circuit breaker box.

11. The power generation and control system of claim 8, wherein the main power flow controller is adapted to replace an electrical power meter.

12. The power generation and control system of claim 8, wherein the power generation controller further includes a pattern generator for sending a power usage pattern and the main power flow controller further includes a pattern sensor for sensing the power usage pattern caused by the pattern generator and determining that the generator is downstream of the main power flow controller.

13. The power generation and control system of claim 8, wherein the power generation controller can only provide power to the circuit if the power generation controller is located downstream from the main power flow controller.

14. A method for installing in an end user establishment a control system for controlling distribution of power between a power grid and a circuit including a branch circuit having an individual circuit breaker and for allowing anyone to attach a power generation device to the branch circuit, said method comprising:
   installing the control system in the end user establishment between the power grid and the circuit;
   generating a permission signal with the control system to indicate a presence of the control system;
   enabling the power generation device to provide power only when the permission signal is provided by the control system; and
   allowing installation of the power generation device in the end user establishment and connection of the device to the branch circuit downstream of the individual circuit breaker by anyone when the control system is present.

15. The method of claim 14, wherein installing the control system is performed by an electrician and allowing installation of the power generation device includes permitting anyone to connect the power generation device by plugging the power generation device into a power receptacle located in the branch circuit.

16. The method of claim 4, further comprising:
   monitoring the power grid to determine whether there is power on the power grid; and
   preventing power from flowing from the circuit to the power grid when there is no power on the power grid.

17. The method of claim 14, wherein generating a permission signal only occurs if the power generation device is located downstream from the control system.

18. The method of claim 14, wherein generating a permission signal further includes sending a power usage pattern from the power generation device, sensing the power usage pattern with the control system, determining that the power generation device is downstream of the control system and only sending the permission signal to the power generation device if the power generation device is downstream of the control system.

19. The method of claim 17, wherein sending the power usage pattern includes varying power flowing between the power generation device and the control system.

20. The method of claim 14, further comprising supplying power to the control system with a low voltage signal during a power outage.

21. The method of claim 14, further comprising turning on the power generation device during a power outage.

* * * * *